United States Patent
Neelakant et al.

(10) Patent No.: US 9,565,223 B2
(45) Date of Patent: Feb. 7, 2017

(54) SOCIAL NETWORK INTERACTION

(75) Inventors: Vineeth Neelakant, Bangalore (IN); Nikhil Nehriya, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 418 days.

(21) Appl. No.: 14/123,313

(22) PCT Filed: May 29, 2012

(86) PCT No.: PCT/FI2012/050520
§ 371 (c)(1),
(2), (4) Date: Jan. 29, 2014

(87) PCT Pub. No.: WO2012/168546
PCT Pub. Date: Dec. 13, 2012

(65) Prior Publication Data
US 2015/0040035 A1    Feb. 5, 2015

(30) Foreign Application Priority Data
Jun. 9, 2011  (IN) .......................... 1955/CHE/2011

(51) Int. Cl.
*H04L 29/06* (2006.01)
*H04L 12/58* (2006.01)
(Continued)

(52) U.S. Cl.
CPC .......... *H04L 65/403* (2013.01); *G06F 3/0488* (2013.01); *G06F 3/04842* (2013.01);
(Continued)

(58) Field of Classification Search
CPC ....... G06F 3/0488; G06F 3/0484; G06F 3/048
(Continued)

(56) References Cited

U.S. PATENT DOCUMENTS 7,917,584 B2   3/2011   Arthursson
8,872,767 B2   10/2014  Khosravy et al.
(Continued)

FOREIGN PATENT DOCUMENTS

EP   2237533 A1   10/2010

OTHER PUBLICATIONS

International Search Report and Written Opinion received for corresponding Patent Cooperation Treaty Application No. PCT/FI2012/050520, dated Nov. 1, 2012, 13 pages.
(Continued)

*Primary Examiner* — Andrea Leggett
(74) *Attorney, Agent, or Firm* — Alston & Bird LLP

(57) ABSTRACT

In a mobile communications terminal 100, there is provided a gestural control application for associated operation with an image viewing application. The gestural control application is configured to receive user gestures inputted through a touch-sensitive display of the apparatus when one or more images is displayed by the image viewing application. The gestural control application is configured to identify a correspondence between a received gesture and one of a plurality of locally-stored reference gestures and to identify selection by means of the inputted gesture of one or more entities in the or each image. By means of this identification and selection, said application is configured to communicate and apply a function associated with the identified reference gesture to an external web site through which is accessed a predetermined social network application, the function being applied in relation to the selected one or more entities.

19 Claims, 9 Drawing Sheets

(51) Int. Cl.
*G06Q 10/10* (2012.01)
*G06Q 50/00* (2012.01)
*G06F 3/0488* (2013.01)
*G06F 3/0484* (2013.01)

(52) U.S. Cl.
CPC ......... *G06F 3/04883* (2013.01); *G06Q 10/10* (2013.01); *G06Q 50/01* (2013.01); *H04L 51/32* (2013.01)

(58) Field of Classification Search
USPC ....................................................... 715/753
See application file for complete search history.

(56) References Cited

U.S. PATENT DOCUMENTS

| 2010/0241611 | A1 | 9/2010 | Zuber |
| 2010/0246571 | A1* | 9/2010 | Geppert .............. G06F 3/04817 370/352 |
| 2010/0262916 | A1 | 10/2010 | Jones et al. |
| 2011/0055725 | A1 | 3/2011 | Folgner et al. |

OTHER PUBLICATIONS

Extended European Search Report for corresponding European Patent Application No. 12797233.9 dated Oct. 6, 2014, 5 pages.

\* cited by examiner

| Gesture | Application(s) Covered | Tagged Entities Covered | Social Network Function |
|---|---|---|---|
| Single finger swipe | 1+ Photo(s) | 1+ | (F) Send Friend Request to Entity/Entities<br>(L) Send Network Request to Entity/Entities |
| Single finger swipe | Album name & 1+ Photo(s) | 1+ | (F) Share Album with Entity/Entities<br>(L) N/A |
| Single finger swipe | Web Browser & 1+ Photo(s) | 1+ | (F) Share content link with Entity/Entities<br>(L) Share content link with Entity/Entities |
| Double finger swipe | 1+ Photo(s) | 2+ | (F) Send Friend Recommendation between Entities<br>(L) Send Network Recommendation between Entities |
| Pinch to Zoom | 1 Photo | 1 | (F) Open text box, then post text to Entity's wall<br>(L) Open text box, then post text to Entity's Inbox |
| Arrow | 1 Photo | 1 | (F) Send "Poke" to Entity<br>(L) N/A |

(F) = Facebook
(L) = LinkedIn

*Figure 8*

SOCIAL NETWORK INTERACTION

RELATED APPLICATION

This application was originally filed as Patent Cooperation Treaty Application No. PCT/FI2012/050520 filed May 29, 2012 which claims priority benefit to Indian Patent Application No. 1955/CHE/2011, filed Jun. 9, 2011.

FIELD OF THE INVENTION

This invention relates to social network interaction.

BACKGROUND TO THE INVENTION

User interaction with social network applications is usually by means of logging into a website and thereafter browsing pages of the website over the Internet.

Social network applications contain large quantities of information and store profiles for large numbers of people. This means that, in order for a user to locate a particular contact, a number of sequential browsing steps are required over the Internet. There may be numerous people with the same or similar names, and so further browsing steps are required to confirm that a particular profile corresponds to the required contact. Even when a user is connected to a contact, applying a social network function to that contact, such as a photo sharing function, will require transmission of a number of separate commands including selecting the function from a menu of available functions, then selecting the or each friend.

As well as being time-consuming, each browsing step requires data to be transmitted and received over a network such as the Internet. Where communication with social network applications is performed using a wireless data terminal, such as a mobile telephone or tablet computer, data usage is an important factor given the limited bandwidth available.

SUMMARY OF THE INVENTION

A first aspect of the invention provides apparatus comprising:
   means for receiving through a user interface a user gesture made in relation to one or more displayed digital images, the or each image having one or more tags each identifying an entity displayed in the or each image;
   means for identifying locally a predefined social network function corresponding to said received user gesture and a selected tagged entity or entities indicated by said gesture; and
   means for communicating the locally-identified function to an external social network application so as to apply thereat said function in relation to the selected entity or entities.

The identification means may be configured to identify, from the received user gesture, correspondence with one of a plurality of locally-stored reference gestures each of which may be associated with a respective different social network function for being applied at an external social network.

The apparatus may further comprise a locally-stored contact list configured to store, for the or each tagged entity, associated identification data to enable the communicating means to uniquely identify a selected entity or entities to an external social network application where they have a presence. The contact list may be configured to store, for the or each tagged entity, identification data for a plurality of different external social network applications where the entity has a presence. The communicating means may be configured to select a subset of the different social network applications with which to apply the social network function dependent on one or more selection rule(s) applicable to at least one of the social network applications. The selected social network function may be configured, when applied by the communicating means, to share stored content (or link online content) with the selected entity or entities, and in which the selection rule(s) determine the subset of social network applications dependent on metadata associated with the content. The selection rule(s) for a social network application may identify a geographical location such that only content having metadata corresponding to said location may be shared when the selected social network function is applied.

The identifying means may be configured to identify a gesture made across two or more independent, simultaneously displayed images to indicate selection of tagged entities appearing in different images.

The user interface may be a touch-screen through which touch-based user gestures are received by the receiving means.

The apparatus may further comprise means to display visually a path representative of the received user gesture.

The apparatus may further comprise means to display visually selection of an entity or entities during receipt of a gesture.

One of the reference gestures may be associated with a friend/join network request function at an external social network application, and wherein the communicating means may be configured subsequently to apply the function to the social network application in relation to one or more selected entities indicated by the gesture.

One of the reference gestures may be associated with a friend/join network recommendation function at an external social network application, and wherein the communicating means may be configured subsequently to apply the function to the social network application in relation to two or more selected entities indicated by the gesture.

One of the reference gestures may be associated with a content sharing function at an external social network application and wherein the communicating means may be configured subsequently to apply the function to the social network application so as to share thereat stored content with one or more selected entities indicated by the gesture. The stored content may be taken from a different application from that showing the tagged digital images.

The receiving, identifying and communicating means may be provided in a single software application and said software application may be configured to run automatically upon operation of an image viewing application provided on the apparatus.

The apparatus may be communications terminal, for instance a wireless communications terminal.

A second aspect of the invention provides apparatus comprising:
   a gestural control application for associated operation with an image viewing application, the gestural control application being configured to receive user gestures inputted through a touch-sensitive display of the apparatus when one or more images is displayed by the image viewing application, to identify a correspondence between said received gesture and one of a plurality of locally stored reference gestures, to identify selection by means of the inputted gesture of one or more entities in the or each image, and to communicate and apply a function associated with the identified reference gesture to an external web site through which is accessed a predetermined social network application, the function being applied in relation to the selected one or more entities.

A third aspect of the invention provides a method comprising:

receiving through a user interface a user gesture made in relation to one or more displayed digital images, the or each image having one or more tags each identifying an entity displayed in the or each image;

identifying locally a predefined social network function corresponding to said received user gesture and a selected tagged entity or entities indicated by said gesture; and communicating the locally-identified function to an external social network application and applying thereat said function in relation to the selected entity or entities.

A fourth aspect of the invention provides a computer program comprising instructions that when executed by computer apparatus control it to perform the method above.

A fifth aspect of the invention provides a non-transitory computer-readable storage medium having stored thereon computer-readable code, which, when executed by computing apparatus, causes the computing apparatus to perform a method comprising:

receiving through a user interface a user gesture made in relation to one or more displayed digital images, the or each image having one or more tags each identifying an entity displayed in the or each image;

identifying locally a predefined social network function corresponding to said received user gesture and a selected tagged entity or entities indicated by said gesture; and communicating the locally-identified function to an external social network application and applying thereat said function in relation to the selected entity or entities.

A sixth aspect of the invention provides apparatus, the apparatus having at least one processor and at least one memory having computer-readable code stored thereon which when executed controls the at least one processor:

to receive through a user interface a user gesture made in relation to one or more displayed digital images, the or each image having one or more tags each identifying an entity displayed in the or each image;

to identify locally a predefined social network function corresponding to said received user gesture and a selected tagged entity or entities indicated by said gesture; and to communicate the locally-identified function to an external social network application and applying thereat said function in relation to the selected entity or entities.

BRIEF DESCRIPTION OF THE DRAWINGS

Embodiments of the present invention will now be described, by way of example only, with reference to the accompanying drawings, in which:

FIG. 8 is a schematic diagram representing an example set of reference gestures employed within the gesture control application shown in FIG. 3;

DETAILED DESCRIPTION OF PREFERRED EMBODIMENTS

Figure 1:
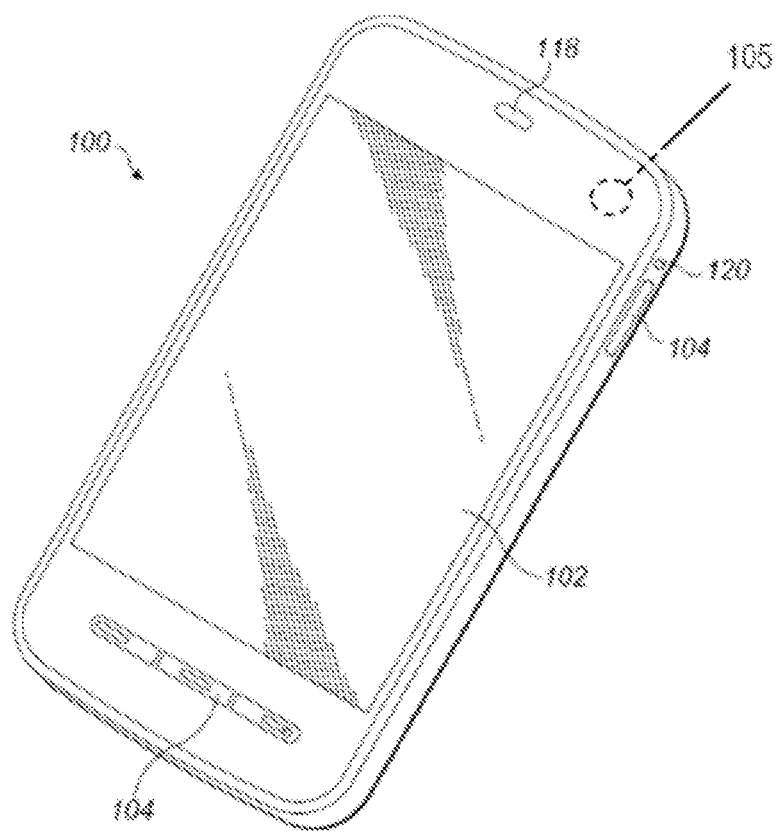
FIG. 1 is a perspective view of a mobile terminal embodying aspects of the invention.

Referring firstly to FIG. 1, a terminal 100 is shown. The exterior of the terminal 100 has a touch sensitive display 102, hardware keys 104, a rear-facing camera 105, a speaker 118 and a headphone port 120.

Figure 2:
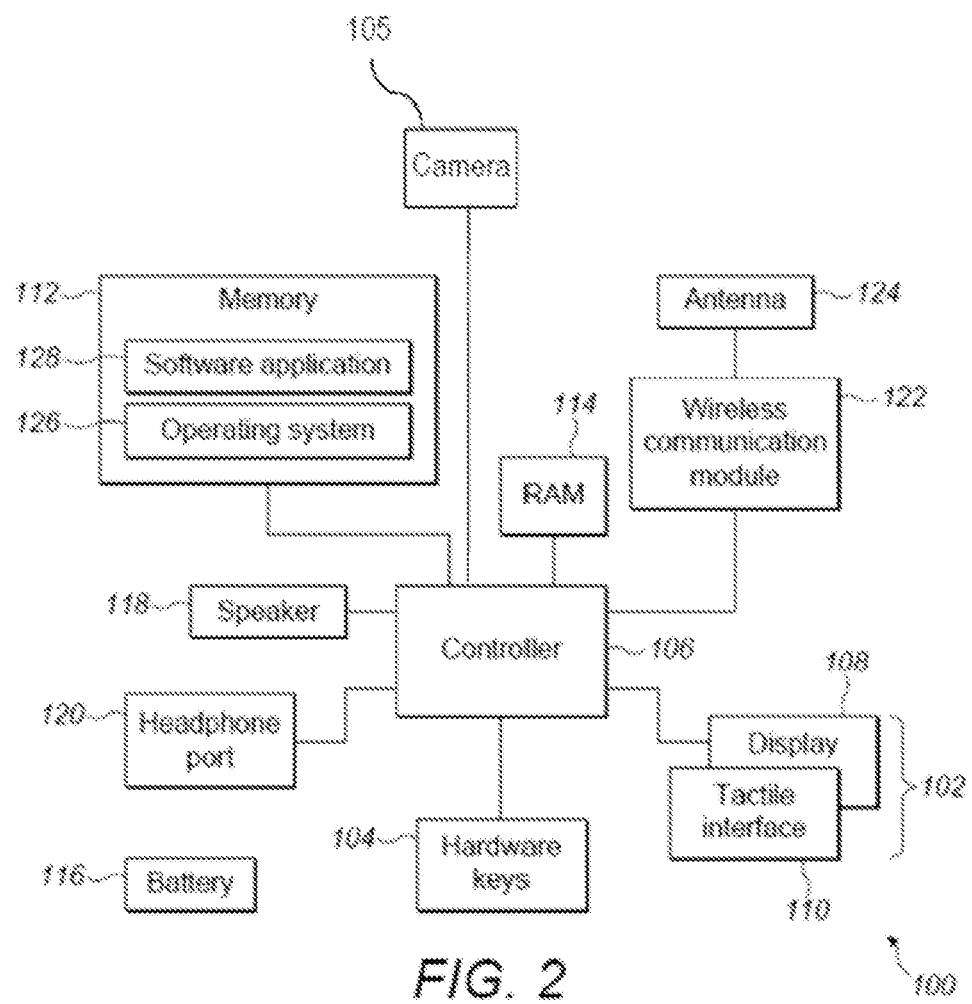
FIG. 2 is a schematic diagram illustrating components of the FIG. 1 mobile terminal and their interconnection.

FIG. 2 shows a schematic diagram of the components of terminal 100. The terminal 100 has a controller 106, a touch sensitive display 102 comprised of a display part 108 and a tactile interface part 110, the hardware keys 104, the camera 105, a memory 112, RAM 114, a speaker 118, the headphone port 120, a wireless communication module 122, an antenna 124 and a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores, amongst other things, an operating system 126 and may store software applications 128. The RAM 114 is used by the controller 106 for the temporary storage of data. The operating system 126 may contain code which, when executed by the controller 106 in conjunction with RAM 114, controls operation of each of the hardware components of the terminal.

The controller 106 may take any suitable form. For instance, it may be a microcontroller, plural microcontrollers, a processor, or plural processors.

The terminal 100 may be a mobile telephone or smartphone, a personal digital assistant (PDA), a portable media player (PMP), a portable computer or any other device capable of running software applications and providing audio outputs. In some embodiments, the terminal 100 may engage in cellular communications using the wireless communications module 122 and the antenna 124. The wireless communications module 122 may be configured to communicate via several protocols such as GSM, CDMA, UMTS, Bluetooth and IEEE 802.11 (Wi-Fi).

The display part 108 of the touch sensitive display 102 is for displaying images and text to users of the terminal and the tactile interface part 110 is for receiving touch inputs from users.

As well as storing the operating system 126 and software applications 128, the memory 112 may also store multimedia files such as music and video files. A wide variety of software applications 128 may be installed on the terminal including web browsers, radio and music players, games and utility applications. Some or all of the software applications stored on the terminal may provide audio outputs. The audio provided by the applications may be converted into sound by the speaker(s) 118 of the terminal or, if headphones or speakers have been connected to the headphone port 120, by the headphones or speakers connected to the headphone port 120.

In some embodiments the terminal 100 may also be associated with external software application not stored on the terminal. These may be applications stored on a remote server device and may run partly or exclusively on the remote server device. These applications can be termed cloud-hosted applications. The terminal 100 may be in communication with the remote server device in order to utilise the software application stored there. This may include receiving audio outputs provided by the external software application.

In some embodiments, the hardware keys 104 are dedicated volume control keys or switches. The hardware keys may for example comprise two adjacent keys, a single rocker switch or a rotary dial. In some embodiments, the hardware keys 104 are located on the side of the terminal 100.

Briefly, the terminal 100 provides an intuitive and data-efficient way of performing social network functions through gestural commands made locally at the terminal. Desired functions are indicated locally by the gesture, as are selected entities to which the functions are to be applied. Unnecessary browsing over the Internet can be avoided because functions and contacts can be identified locally.

Figure 3:
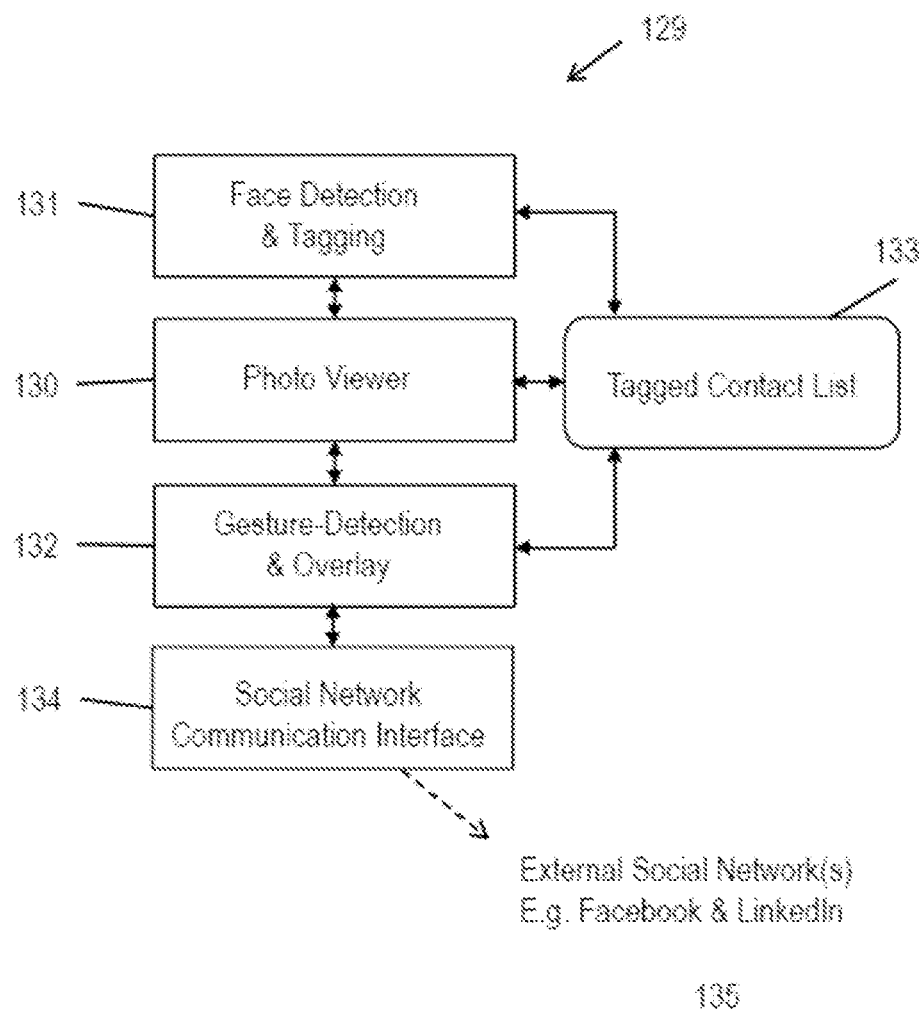
FIG. 3 is a schematic diagram illustrating functional components of a gestural control application for execution on the FIG. 1 mobile terminal.

Referring to FIG. 3, there are shown various software modules which are stored on the memory 112 and together provide a system and method for gestural-based user interaction with external social network applications. Each will be briefly described.

A photo viewer 130 is an application which enables the user to open and organise photos and other digital images stored on the memory 112. Google's Picasa is one such application, although any proprietary photo viewing application is applicable.

A face detection and tagging module 131 (hereafter "face detection module") operates in conjunction with the photo viewer 130 to automatically detect faces within photographs when opened. Furthermore, the face detection module 131 prompts the user to enter metadata for each detected face. This process is generally known as tagging, with metadata being referred to as a tag. In this case, the face detection module 131 prompts the user to include, for detected faces, a contact name (e.g. John Smith) and details of that contact's social network presence, particularly (i) details of which external social network applications they belong to, and (ii) the contact's unique identity within the respective social network applications, e.g. www.examplesocialnetworkprovider.com/johnsmith123.

Optionally, the face detection module 131 can identify correlations between photos and suggest tag information to be applied to untagged photos.

A tagged contact list 133 stores the above-mentioned tag data entered by the user. This can include, in addition to the metadata, a reference to the associated image and the detected face rectangles. The terminal 100 therefore maintains a locally-stored list of contacts which identifies contact names, images the contacts are shown in, and their social network presence and identities.

Some proprietary applications provide the combined functions of the photo viewer 130, the face detection module 131 and, to some extent, the tagged contact list 133. One such application is Picasa, mentioned above. In Picasa, photos can be organised within albums, with metadata being associated with each photo and albums containing photos. The above-described facial detection, tagging and tag suggestion functions are provided for. Accordingly, Picasa can be employed in the present embodiment, although in order to enable input of a contact's social network information, the tagged contact list 133 is provided as a separate module which is automatically synchronised with Picasa's in-built 'people list'.

A gesture-detection and overlay module 132 (hereafter "gesture detection module") is an application that runs in conjunction with the photo viewer 130, and preferably automatically when the photo viewer 130 is executed on the terminal 100. The gesture detection module 132 is largely a background process having the function of monitoring user gestures made through the touch-sensitive display 102 over the entire display area; it monitors gestures made not only over photos presented by the photo viewer 130 but also other windows and applications. It also presents on the display 102 a line tracing the gesture to indicate visually the path of the current gesture and bounding boxes around tagged faces to indicate selection. The overlay module also indicates the social network operation with the entities involved.

The gesture-detection module 132 has access to a locally-stored set of reference gestures and is operable to compare inputted user gestures with the reference gestures to identify a match. Each reference gesture corresponds to a social network function for a given social network application; for example, reference gesture RF#1 may correspond to a "friend request" in a first social network service (e.g. Facebook) and to a "join my network" request in a second network (e.g. LinkedIn). The gesture-detection module 132 is also operable to identify which tagged contacts are indicated by the gesture, particularly by detecting which tagged contacts in the open photo viewer 130 the gesture passes over. In identifying contacts, the gesture-detection module 132 accesses the tagged contact list 133 for each such contact and acquires their social network presence and identity information which is used subsequently to apply the function to the or each contact.

Further, the gesture-detection module 132 is operable to identify information identified by gestures in relation to windows or applications outside of the photo viewer 130, for example the name of a photo album, a hyperlink within a web browser or document(s) in a file-manager window. If the inputted gesture is matched with a reference gesture and identifies at least one contact from a tagged photo, then this information can be shared with the or each contact, e.g. by sharing a photo album or hyperlink or the document with them.

An inputted gesture therefore provides the dual purpose of indicating a social network function in relation to one or more contact(s) shown in photos presented by the photo viewer 130.

If there is a match between an inputted user gesture and one of the reference gestures, the gesture-detection module 132 therefore selects the corresponding social network function and one or more contacts to which the function should be applied. Application of the selected function is performed by a further module, namely a social network communications interface 134, described below. If there is no match, or an inputted gesture is not made in relation to a tagged photo, the gesture is assumed to be a conventional operating system control gesture which enables scrolling, zooming, panning and so on.

The social network communications interface 134 (hereafter "interface") is configured to apply the selected social network function to one or more external social network applications in which the user of the terminal 100 has a presence. For this purpose, the interface 134 stores username and password information for the user enabling automatic logging-in to the or each social network application. Data communications takes place in the conventional manner, e.g. using Wi-Fi, 3G, GPRS and so on. In response to a match by the gesture-detection module 132, the selected function (or functions if two or more social network applications are involved) is (are) applied automatically without human intervention.

A more detailed implementation will now be described.

Figure 4:
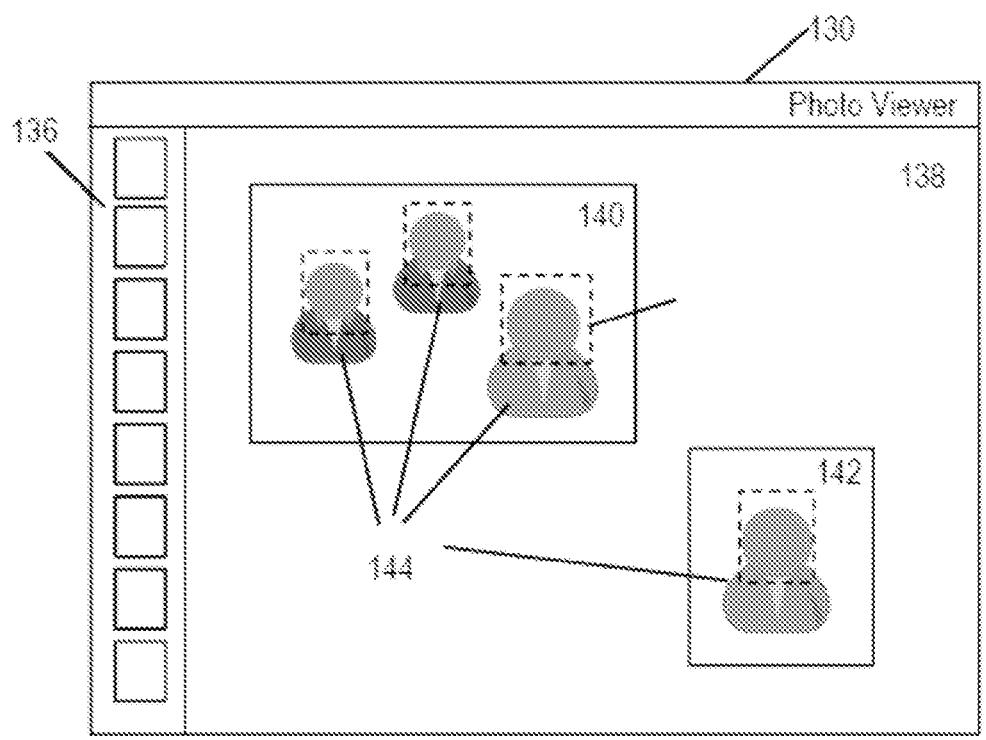
FIG. 4 is a schematic diagram illustrating a graphical user interface (GUI) of an image viewing application forming part of the gestural control application shown in FIG. 3.
Figure 5:
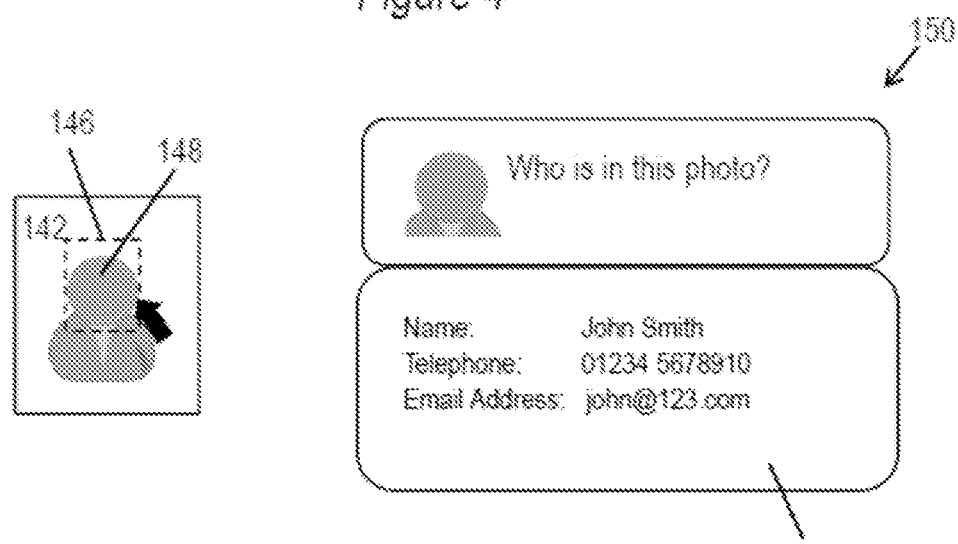
FIG. 5 is a schematic diagram representing a tag menu associated with an entity shown in the image viewing application shown in FIG. 3.

Referring to FIG. 4, a graphical user interface (GUI) for the photo viewer 130 is shown. The GUI presents a menu bar, a browsing menu 136 and a main workspace area 138 within which individual photos or groups of photos can be viewed. First and second photos 140, 142 are shown open in the main workspace area 138. The first photo 140 is a group shot which includes three people, indicated collectively by reference numeral 144. The second photo 142 is a portrait shot which includes one person 144. The photo viewer application 130 performs automatic facial detection and indicates the results using bounding boxes 146. Thereafter, the user is able to select one or more of the bounding boxes 146 and tag that part of the photo with relevant contact information. This is performed using a 'people list' menu 150 shown in FIG. 5, which is assumed to be a basic tag listing associated with the photo viewer 130. When at least the contact's name is entered, the details can be saved and the second photo 142 is thereafter tagged with that person's name. Other photos depicting the same person can be tagged, either automatically by means of the photo viewer application 130 analysing previous face patterns, or manually by the user.

The people list is synchronised with the tagged contact list 133 to include details of any new or updated tagged entities. The user is prompted to identify in the tagged contact list 133 the unique social network identifiers for the contacts.

Figures 6, 7:
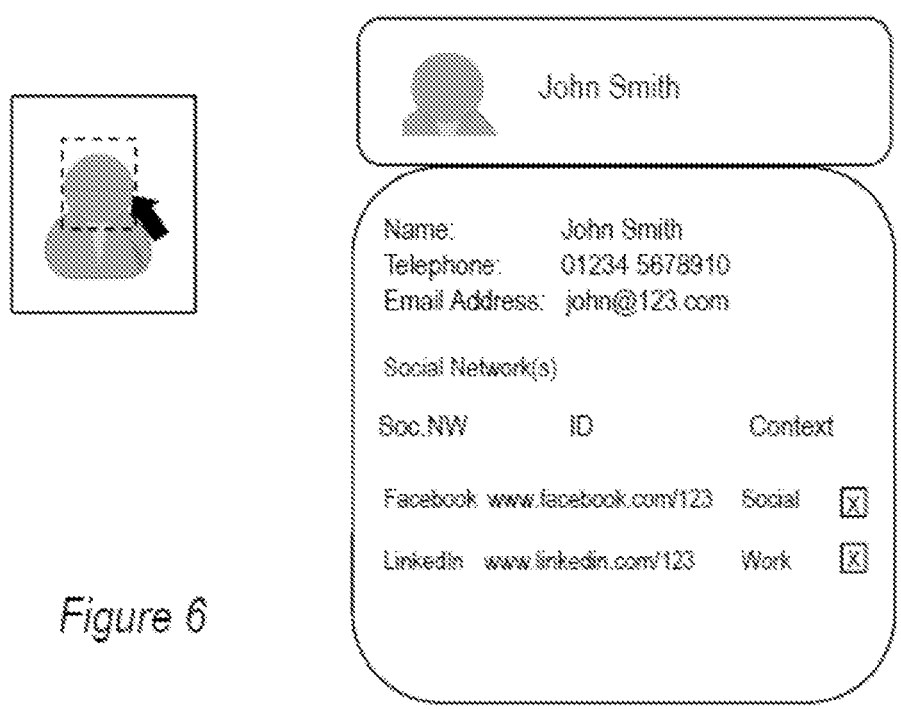
FIG. 6 is a schematic diagram representing an individual record within a contact list forming part of the gestural control application shown in FIG. 3.
FIG. 7 is a schematic diagram representing a set of social network selection rules used by a communications interface module of the gestural control application shown in FIG. 3.

Referring to FIG. 6, an individual record in the tagged contact list 133 is shown. As can be seen, the record is effectively an extended form of the people list menu shown in FIG. 5. The user is prompted to input details of (i) each social network application where the contact has a presence, (ii) the contact's unique identifier within the relevant social network application and, optionally, (iii) context information such as whether the social network application relates to "social" or "work" networking. The user can select to enable/disable particular ones of the contexts, for example if they do not wish to share information on that contact's LinkedIn profile. Regarding (ii), another way for a user to associate a contact's unique identifier within a social network is by means of a dedicated social network application. For example, Nokia's Ovi allows the user to associate a Facebook contact with a phonebook contact.

With this in mind, the interface 134 is further operable to apply automatic selection rules which determine how particular types of content, particularly photos, are shared with external social network applications. Referring to FIG. 7, a set of exemplary social network selection rules is shown. For each of the contexts "social" and "work" there is stored an associated set of selection criteria. A first set relates to tags associated with photos or photo albums. So, in this case, only photos or albums having tags including the words "work", "conference" or "Singapore" will be applied to social network applications identified as work-related in the tagged contact list 133. All photos or albums can be shared with social network applications identified as social (as opposed to work)-related.

A second set of selection criteria relates to GPS co-ordinate tags associated with photos or albums. As will be known, certain types of terminal having a GPS receiver store positional data as part of a photo's file information (i.e. the position determined at the time the photo was taken). Therefore, selection of which social network application(s) content is applied to, or shared over, can be based on where the selected content was captured. In this case, GPS co-ordinates associated with the user's work place and Singapore are stored and associated with the context 'work' and so only photos having the same or closely similar GPS data will be shared with work-based social networks.

Referring to FIG. 8, there is shown a set 160 of reference gestures RG#1-RG#6 employed within the gesture-detection module 132. As will be seen, the gestures are defined along with other criteria (applications and number of entities covered by the inputted gesture) for the purpose of determining whether an inputted gesture is a match or not. If there is a match, a corresponding social network function is applied to the contacts selected by the inputted gesture.

Figure 9:
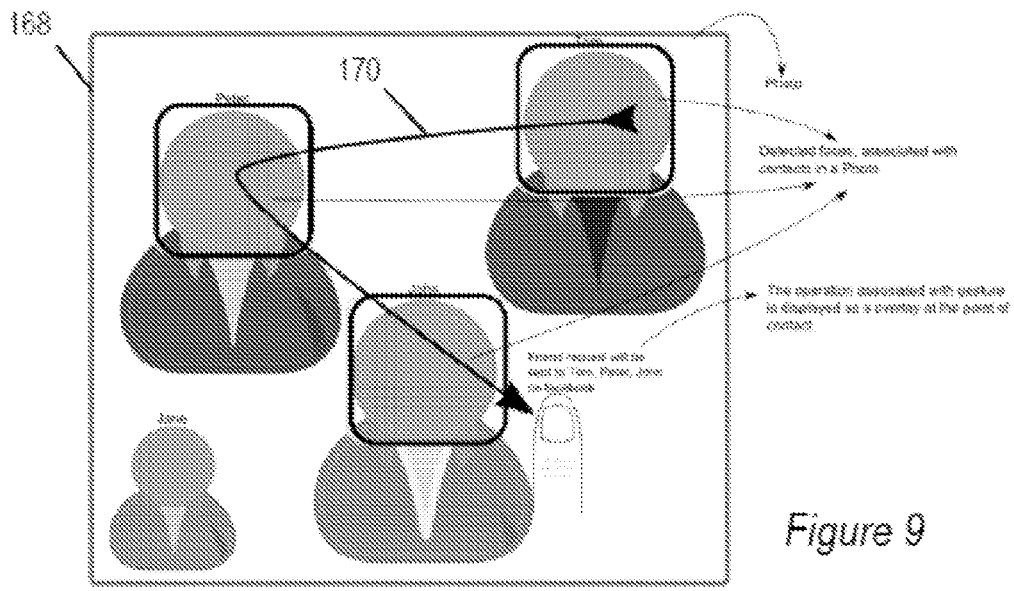
FIGS. 9 to 11 are views of a GUI of the image viewing application during use of the gestural control application to apply respective different functions at an external social network application.

Taking a first example, an inputted single finger swipe on the touch-sensitive display 102 is considered a match if it covers one or more photos within the photo viewer 130 and one or more contacts are identified by the swipe. FIG. 9 shows an example of such a gesture. Here, four tagged contacts (Peter; Tom; John; Jane) are shown in a single photo 168. The inputted gesture, indicated by the solid arrow 170, is detected as a single finger swipe over three tagged faces in the photo 168. This causes a trace line to be overlaid with bounding boxes for the contacts (Tom; Peter; John) presented to confirm selection. A match is therefore made with RG#1 and so the interface module 134 is operable automatically to send a 'friend request' from the user to each of Tom, Peter and John's Facebook accounts, if Facebook is identified in the tagged contact list 133 and the context information allows, and also a 'join my network' request to each of their LinkedIn accounts, again, if they have a presence in LinkedIn and the context information allows.

Each of the other reference gestures will now be described in brief.

RG#2 corresponds to a single finger swipe gesture made between a photo album name presented in the photo viewer 130 and one or more photos in which at least one contact is selected. The result of this gesture is to apply a "share album" request to the selected contacts in Facebook, the request allowing the album of photos to be shared with them. The album of photos may be locally stored, that is stored on the terminal 100. The album of photos may be a proxy representation of the online album, stored on a server or a cloud. Hence, alternatively, the gesture may result in the sharing of an online album, typically by sending a link to each selected contact, and the link when activated opens the online album on the recipients' device. For example, this may open the Picasa web album or a Flickr album link in a browser or another application in the recipient's device. For a locally stored album or other content such as document, the album or the document can be sent to the recipient's social network email address.

Figure 10:
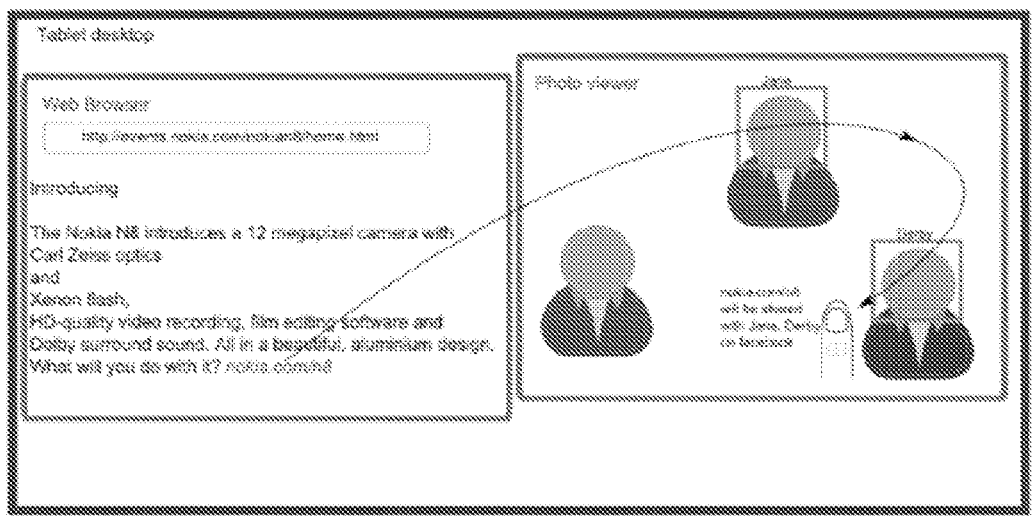

RG#3 corresponds to a single finger swipe gesture made between information in a web browser, e.g. a hyperlink, and one or more photos in which at least one contact is selected. The result of this gesture is to apply a "share content link" with the or each selected contact in Facebook and LinkedIn, the request resulting in the selected information being shared with them. FIG. 10 illustrates this situation, with a hyperlink from a web browser being shared with two contacts selected from the photo viewer 130. As another example, the link may be shared via twitter with each recipient's twitter id marked with the "@" tag.

Figure 11:
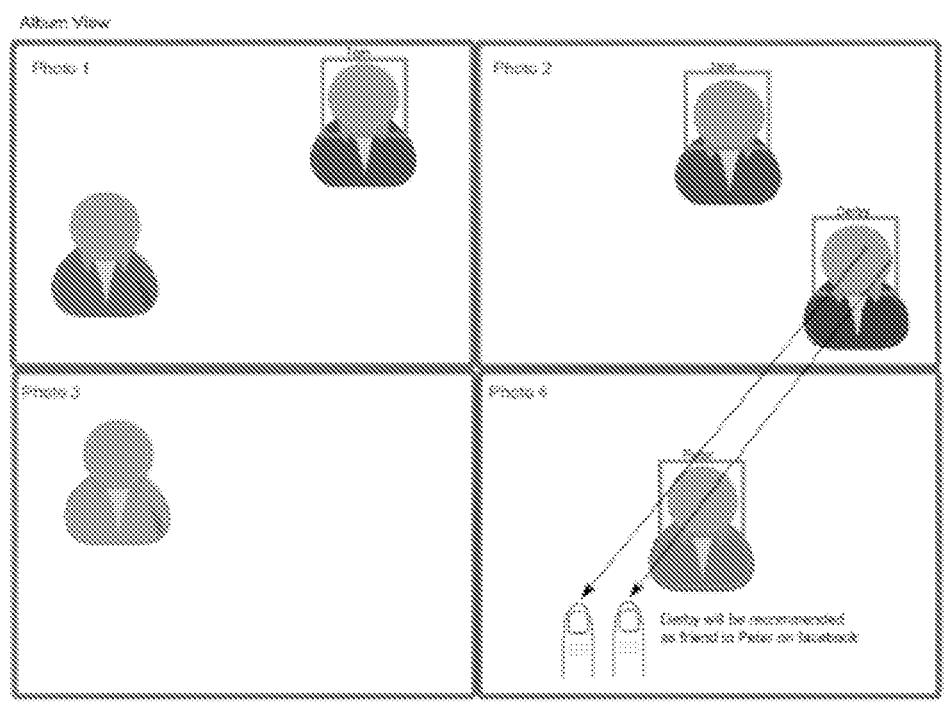

RG#4 corresponds to a double finger swipe gesture made in a single or over multiple photo(s) between at least two contacts. The result of this gesture is to send a "friend recommendation" request in Facebook or a "network recommendation" request in LinkedIn. FIG. 11 illustrates this situation.

RG#5 corresponds to a pinch-out gesture made over a single contact in a photo. The result of this gesture is to open a text box prompting user-entry of a message which is subsequently posted to either the selected contact's wall, in Facebook, or to their inbox in LinkedIn. As another example, this may send a tweet with each recipient's twitter id marked with the "@" tag RG#6 corresponds to an arrow-shaped gesture made over a single contact in a photo. The result of this gesture is to apply a 'poke' function to the contact on Facebook. There is currently no equivalent in LinkedIn.

Figure 12:
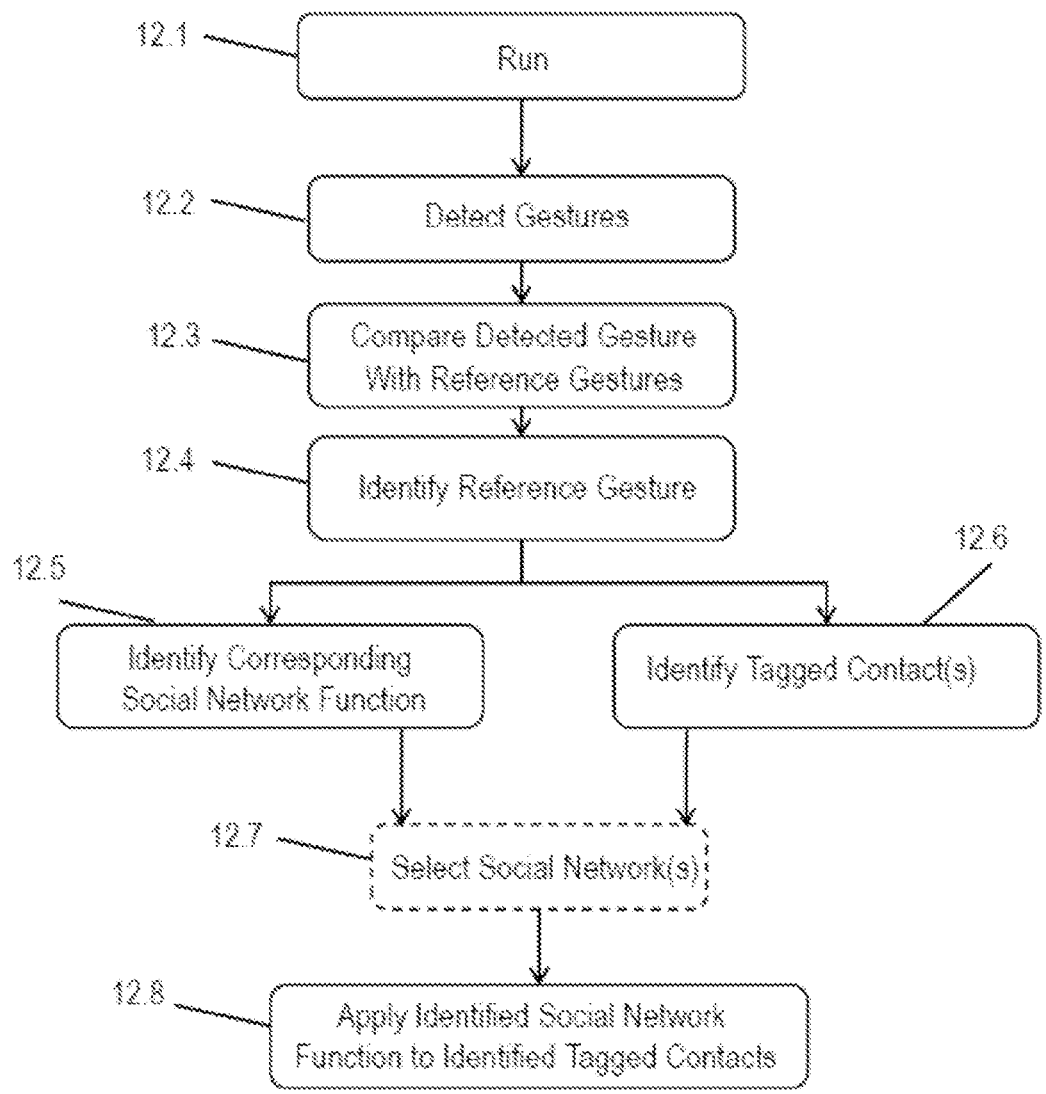
FIG. 12 is a flow diagram indicating the main functional steps performed by the gestural control application during operation.

Referring to FIG. 12, there will now be described the main operating steps performed by the gesture-detection and interface modules 132, 134. In a first step 12.1 the modules are run, usually in response to the photo viewer 130 being run on the terminal 100. In step 12.2 the gesture-detection module 132 detects inputted user gestures; in step 12.3 it compares inputted user gestures with the reference gestures RG#1-RG#6 and, in step 12.4 identifies a match. In step 12.5 the social network function associated with the matched reference gesture is identified. In step 12.6 the tagged contacts covered by the gesture are identified. Steps 12.5 and 12.6 can take place in any order or simultaneously. In step 12.7 the social network application to which the identified function is to be applied is selected; this can take into account the aforementioned contextual data. In step 12.8 the identified function is communicated and applied to the relevant social network application(s) in respect of the identified contact(s). This takes place automatically and is controlled by the interface 134.

The gesture-detection and interface modules 132, 134 and the tagged contact list 133 can be combined in a single application for installation on the terminal 100 and configured to interact with the photo viewer 130 which may be a standard, already present, application or a separate proprietary application such as Picasa, which provide plug-in and extension support. Applications with a plug-in architecture for third-party developers can be extended to have the discussed gesture support. For example, this feature can be added to browsers such as Firefox, Chrome via extensions/plug-ins so that the feature will get activated while viewing Picasa web albums or while viewing Facebook's photo viewer. Alternatively, all modules, including the photo viewer 130 can be provided as a single application for installation and running on the terminal 100.

The preferred embodiment described herein provides a convenient and intuitive way for users to interact with external social networks and perform many of the known functions provided by said networks using gestural commands at the local terminal 100. Selection of social network functions and contacts to which they are to be applied is made locally and therefore reduces the amount of data required to be transferred over the Internet when browsing directly with the external social network application.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

We claim:

1. An apparatus comprising:
   at least one processor; and
   at least one memory including computer program code, the at least one memory and the computer program code configured to, with the at least one processor, cause the apparatus to perform at least the following:
   receive through a user interface a user gesture made in relation to one or more displayed digital photographs, wherein each photograph, of the one or more displayed digital photographs, has one or more faces each with a tag identifying a contact associated with the one or more faces in the photograph;
   identify, from the received user gesture, correspondence with one of a plurality of locally-stored reference gestures, wherein each reference gesture of the locally-stored reference gestures is associated with a respective different social network function for being applied at an external social network application;
   identify the social network function corresponding to the one of a plurality of locally-stored reference gestures identified and a tagged contact or contacts indicated by said user gesture; and
   communicate the locally-identified function to the external social network application so as to apply thereat said function in relation to the tagged contact or contacts indicated by said user gesture.

2. The apparatus according to claim 1, wherein the apparatus is further caused to:
   store, for each tagged contact, associated identification data to uniquely identify the tagged contact or contacts to an external social network application where they have a presence.

3. The apparatus according to claim 2, wherein the contact list is configured to store, for each tagged contact, identification data for a plurality of different external social network applications where the contact has a presence.

4. The apparatus according to claim 3, wherein the apparatus is further caused to:
   select a subset of the different social network applications with which to apply the social network function dependent on one or more selection rule(s) applicable to at least one of the social network applications.

5. The apparatus according to claim 4, wherein the apparatus is further caused to:
   cause the selected social network function, when applied, to share stored content with the tagged contact or contacts, and in which the selection rule(s) determine the subset of social network applications dependent on metadata associated with the content.

6. The apparatus according to claim 5, wherein the selection rule(s) for a social network application identifies a geographical location such that only content having metadata corresponding to said location is shared when the selected social network function is applied.

7. The apparatus according to claim 1, wherein the apparatus is further caused to:

identify a gesture made across two or more independent, simultaneously displayed photographs to indicate selection of tagged contacts appearing in different photographs.

8. Apparatus The apparatus according to claim 1, in which the user interface is a touch-screen through which touch-based user gestures are received by the receiving means.

9. The apparatus according to claim 1, wherein the apparatus is further caused to:
displayed visually a path representative of the received user gesture.

10. The apparatus according to claim 1, wherein the apparatus is further caused to:
display visually selection of a contact or contacts during receipt of a gesture.

11. The apparatus according to claim 1, wherein one of the reference gestures is associated with a friend/join network request function at an external social network application, and wherein the apparatus is further caused to:
apply the function to the social network application in relation to one or more selected contacts indicated by the gesture.

12. The apparatus according to claim 1, wherein one of the reference gestures is associated with a friend/join network recommendation function at an external social network application, and wherein the apparatus is further caused to:
apply the function to the social network application in relation to two or more selected contacts indicated by the gesture.

13. The apparatus according to claim 1, wherein one of the reference gestures is associated with a content sharing function at an external social network application, and wherein the apparatus is further caused to:
apply the function to the social network application so as to share thereat stored content or link(s) to online content with one or more selected contacts indicated by the gesture.

14. The apparatus according to claim 13, wherein the stored content or link(s) to online content is taken from a different application from that showing the tagged digital photographs.

15. The apparatus according to claim 1, wherein the computer-readable code is a single software application and in which said software application is configured to run automatically upon operation of an photograph viewing application provided on the apparatus.

16. The apparatus according to claim 1, wherein the apparatus is a communications terminal, for instance a wireless communications terminal.

17. A method comprising:
receiving through a user interface a user gesture made in relation to one or more displayed digital photographs, wherein each photograph, of the one or more displayed digital photographs, has one or more faces each with a tag identifying a contact associated with the one or more faces in the photograph;
identifying, from the received user gesture, correspondence with one of a plurality of locally-stored reference gestures, wherein each reference gesture of the locally-stored reference gestures is associated with a respective different social network function for being applied at an external social network application;
identifying the social network function corresponding to the one of a plurality of locally-stored reference gestures identified and a tagged contact or contacts indicated by said user gesture; and
communicating the locally-identified function to the external social network application so as to apply thereat said function in relation to the tagged contact or contacts indicated by said user gesture.

18. The method according to claim 17, wherein the method is further caused to:
store, for each tagged contact, associated identification data to uniquely identify the tagged contact or contacts to an external social network application where the tagged contact or contacts have a presence.

19. A computer program product comprising at least one non-transitory computer-readable storage medium having stored thereon computer-readable code, the computer-readable code configured to:
receive through a user interface a user gesture made in relation to one or more displayed digital photographs, wherein each photograph, of the one or more displayed digital photographs, has one or more faces each with a tag identifying a contact associated with the one or more faces in the photograph;
identify, from the received user gesture, correspondence with one of a plurality of locally-stored reference gestures, wherein each reference gesture of the locally-stored reference gestures is associated with a respective different social network function for being applied at an external social network application;
identify the social network function corresponding to the one of a plurality of locally-stored reference gestures identified and a tagged contact or contacts indicated by said user gesture; and
communicate the locally-identified function to the external social network application so as to apply thereat said function in relation to the tagged contact or contacts indicated by said user gesture.

* * * * *

UNITED STATES PATENT AND TRADEMARK OFFICE
CERTIFICATE OF CORRECTION

PATENT NO. : 9,565,223 B2
APPLICATION NO. : 14/123313
DATED : February 7, 2017
INVENTOR(S) : Neelakant et al.

Page 1 of 1

It is certified that error appears in the above-identified patent and that said Letters Patent is hereby corrected as shown below:

In the Claims

Column 11,
Line 5, Claim 8, "Apparatus The apparatus" should read --The apparatus--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*